United States Patent [19]

Evans

[11] 4,111,833

[45] Sep. 5, 1978

[54] ACTIVATED CARBON MATERIAL

[75] Inventor: A. Gary Evans, North Augusta, S.C.

[73] Assignee: The United States of America as represented by the United States Department of Energy, Washington, D.C.

[21] Appl. No.: 503,547

[22] Filed: Sep. 5, 1974

[51] Int. Cl.² .......................... B01J 27/06; B01J 27/08
[52] U.S. Cl. .............................. 252/429 R; 252/437; 252/441; 252/447; 55/71; 55/387
[58] Field of Search .................. 252/441, 447, 429 R, 252/437; 55/71, 387

[56] References Cited

U.S. PATENT DOCUMENTS

| | | | |
|---|---|---|---|
| 3,429,103 | 2/1969 | Taylor | 55/71 |
| 3,453,807 | 7/1969 | Taylor | 252/428 X |
| 4,016,242 | 4/1977 | Deitz et al. | 252/441 X |

*Primary Examiner*—Patrick Garvin
*Attorney, Agent, or Firm*—Dean E. Carlson; Allen F. Westerdahl

[57] ABSTRACT

Activated carbon particles for use as iodine trapping material are impregnated with a mixture of selected iodine and potassium compounds to improve the iodine retention properties of the carbon. The I/K ratio is maintained at less than about 1 and the pH is maintained at above about 8.0. The iodine retention of activated carbon previously treated with or coimpregnated with triethylenediamine can also be improved by this technique. Suitable flame retardants can be added to raise the ignition temperature of the carbon to acceptable standards.

15 Claims, No Drawings

ACTIVATED CARBON MATERIAL

CONTRACTUAL ORIGIN OF THE INVENTION

The invention described herein was made in the course of, or under, a contract with the U.S. Atomic Energy Commission.

BACKGROUND OF THE INVENTION

This invention relates to activated carbon material that has improved iodine retention properties and, to a method of treating said material to improve its iodine retention characteristics, in particular at elevated temperatures. This product is particularly useful as an efficient filter or trap for extracting radioactive iodine components from the gaseous effluents of nuclear facilities.

Activated carbon, in the physical form of granular charcoal beds, has been extensively used for the extraction of elemental iodine and iodine compounds from the gaseous streams of nuclear facilities. See *Nuclear Safety*, Vol. 9, No. 5, pp 373-382, 1968. Carbon beds are used as traps for fission product iodine both in nuclear reactor confinement systems and in nuclear fuel processing facilities. Untreated activated carbon will remove a substantial portion of the iodine content of airborne radioactivity when the iodine isotopes are present in elemental form. Depending upon the compound form, the temperature, and the humidity of the system, iodine removal efficiencies ranging from less than 10% to about 99% are possible with untreated material. However, present standards require that iodine removal from the effluents of these confinement systems approach 100%.

In attempts to improve the iodine retention characteristics of activated carbon, various chemical treatments have been used. One well known treatment is to iodize the activated carbon using KI or $I_2$. The best results were obtained with coconut base carbon, but a uniform product was not always obtained. For example, samples of iodized carbon (nominally 5% $KI-I_2$ on 1500-$m^2/g$ coconut base carbon) tested at 180° C showed a variation in iodine penetration rate ranging from 0.023% to 12.8%. The results of tests of coal and petroleum base carbons that were iodized by conventional techniques do not even approach the lower range of the coconut base carbons in iodine retention. Another treatment technique comprises impregnating activated charcoal with certain water-soluble secondary and tertiary amines. Triethylenediamine (TEDA) impregnation, in particular, enhances the affinity of charcoal for the compound methyl iodide. This latter technique is disclosed in U.S. Pat. No. 3,453,807, issued to Roland Taylor on July 8, 1969. Unfortunately, in the most effective percentage range of TEDA, the amine addition substantially reduces the ignition temperature of the impregnated charcoal, rendering it unsuitable for use in the nuclear facility environment wherein ignition temperatures for filter media below about 300° C cannot be tolerated or are unacceptable under current safety standards.

In view of these limitations, it is, therefore, an object of the present invention to provide an improved activated carbon material having improved iodine retention characteristics. It is another object of the invention to provide a method for improving the iodine retention properties of activated carbon without reducing the ignition temperature of the carbon below acceptable limits. It is a further object of the invention to provide an activated carbon material having improved radioiodine retention properties at elevated temperatures.

SUMMARY OF THE INVENTION

The foregoing objects are accomplished in the present invention by providing an activated carbon or charcoal material that is impregnated with a mixture of iodine and basic potassium compounds to improve the iodine retention properties of the activated carbon. To achieve maximum iodine retention on the impregnated carbon, the ratio of I to K in the carbon is maintained at less than about 1.0 and the pH of an aqueous extract of the carbon is maintained above about 8.0. Mixtures of compounds, such as $KOH-I_2$, KOH-KI and $KOH-KI-I_2$ have been found particularly suitable for impregnation of the activated carbon. Also, activated carbon that is coimpregnated or has been previously treated with other compounds, such as triethylenediamine (TEDA) can also be impregnated with the above-mentioned compounds to improve the iodine retention. Further, in accordance with the present invention, there is disclosed the method of improving the iodine retention properties of activated carbon by treating the carbon with a mixture of iodine and basic potassium compounds while maintaining the ratio I to K of less than 1.0 and pH level above about 8.0. Flame retardants, sodium dihydrogen phosphate or potassium dihydrogen phosphate, can also be used along with the iodine and basic potassium compounds to raise the ignition temperature of the treated carbon to meet acceptable levels required in some nuclear facilities.

Activated carbon that is impregnated, as herein set forth, regardless of the origin i.e., coconut, coal, petroleum, or wood, provides improved iodine retention particularly at the high temperatures that may be encountered in a nuclear facility environment. As will be described hereinafter, a more uniform and stable product also results.

DESCRIPTION OF THE PREFERRED EMBODIMENTS

From the analyses of anomalous iodine retention properties of prior art iodized activated carbon prepared from coconut base charcoal, I have discovered that the principal factors essential to high iodine retention at elevated temperatures are the ratio of iodine to potassium content of the carbon and the pH of the carbon. For instance, samples of nominally identical coconut carbon (5% $KI-I_2$ in 1500 $m^2/g$ coconut carbon particles) when subjected to high-temperature penetration tests exhibited iodine penetration values of between 0.028% to 12.8%. Neutron activation analyses of these samples indicated that the best iodine retention was obtained with carbon that had the lowest iodine to potassium ratio and the highest pH of the group of samples. These results will be readily apparent from the following Table I:

TABLE I

| | Chemical Analysis of Commercial Iodized Coconut Carbons | | | | |
|---|---|---|---|---|---|
| Carbon Sample | K, wt % | I, wt % | Atom Ratio I/K | pH[a] | I, Penetration, % |
| A | 0.958 | 4.01 | 1.29 | 7.05 | 12.82 |
| B | 1.14 | 4.42 | 1.19 | 9.56 | 2.41 |
| C | 1.75 | 3.78 | 0.664 | 9.36 | 0.052 |

TABLE I-continued
Chemical Analysis of Commercial Iodized Coconut Carbons

| Carbon Sample | K, wt % | I, wt % | Atom Ratio I/K | pH[a] | I, Penetration, % |
|---|---|---|---|---|---|
| D | 1.55 | 3.01 | 0.600 | 9.62 | 0.028 |

[a]5 g carbon in 20 ml distilled water. pH of water measured after 20 minutes soaking.
[b]High-temperature desorption comprising a 10-minute loading of elemental iodine at ambient temperature and humidity followed by 4 hours desorption at 180° C and <1% relative humidity.

While coconut carbon, with its high natural basicity and high natural K+ content, has been the preferred base material for iodine trapping filters, these data indicate an unacceptable wide variation in iodine penetration of commercially available iodized coconut carbon.

Although my invention is not to be understood as limited to a particular theory, it is suggested that the basic reaction mechanism for high efficiency elemental iodine retention by activated carbon can be illustrated in idealized form by the following equation:

$$I_2 + 2K^+ + 2(OH)^- \rightarrow 2K^+ + 2I^- + H_2O + \tfrac{1}{2} O_2$$

In a strongly basic environment (pH>9.0), one could postulate the formation of the iodate, hypoiodite, or periodate ions as well, but for the present purposes, the conversion of $I_2$ to $I^-$ is illustrative. Thus, it has been found that the potassium salts of iodine show high inherent stability and that stabilized ionic iodine forms under conditions where there is an excess of K+ and a basic environment. Therefore, the selection of activated carbon starting material for impregnation must include consideration of the potassium content of the base carbon, whether the base is coconut, petroleum, coal, or wood. In addition, the method of preparation of the activated carbon and the subsequent impregnation effects the potassium content of the product. In general, use of potassium-free carbon base material is preferred as starting material because the amount of K+ added can be controlled and because it has been found that added potassium (preferably as KOH) is more readily available for reaction with the iodine than the natural potassium present in a carbon base such as coconut carbon. Thus, activated carbon particles, of known K+ content or potassium-free and sized to a suitable mesh, such as about 8 to 16 mesh (U.S. Sieve Series) (Sieve openings between about 2.36 mm and 1.17 mm) are the preferred material for impregnation.

Impregnation of the carbon particles comprises slowly saturating the particles with a solution of a mixture of compounds preferably selected from one of the following: $KOH-I_2$, KOH-KI, or $KOH-KI-I_2$. Although vapor-phase iodine impregnation followed by liquid KOH impregnation can be used, it has been found that a superior product results from a liquid phase co-impregnation with the mixture of KOH or $K_2CO_3$ and a suitable iodine compound. The saturation technique also effects the quality of the product with the best results being obtained by either spraying or dripping the solution onto the particles to assure a uniform saturation of each individual particle. After saturation, the impregnated particles are dried in a suitable drying oven at between about 120° C to 130° C.

In the performance of the impregnation, the solution is adjusted so that the I/K ratio is maintained at less than about 1.0 and the pH of a water extract of the product is greater than about 8.0.

Having described a preferred embodiment, the following specific examples will serve to further illustrate the method of preparing the improved activated carbon material of the invention:

EXAMPLE I

Four samples of potassium-free activated carbon material having different organic origins were sized to between 8 and 16 mesh U.S. Sieve Series and saturated with liquid solutions of $KOH-I_2$ in the concentrations shown in the following Table II. The samples were saturated by spraying the solutions onto the particles while tumbling in a modified laboratory ball mill until the particles were uniformly saturated. After saturation, each sample was dried overnight at 120° C. For comparison, a fifth sample of coal base carbon was vapor-phase impregnated with 4% $I_2$ and subsequently saturated with KOH (1.2% K). Table II also lists for comparison three samples (Samples Nos. 6, 7, 8) of activated coconut base carbon having natural potassium content that were vapor-phase impregnated with iodine to the concentrations indicated. All of the samples were subjected to a 10 minute loading of elemental iodine (tagged with $^{131}I$) at ambient temperature and humidity (23° C-25° C at about 50% relative humidity). Iodine penetration was then measured using a high temperature desorption test by subjecting the iodine loaded sample to 4 hours desorption at 180° C and <1% relative humidity. In a separate test, the ignition temperature was measured in a standard quartz apparatus at a heating rate of 5° C/min. at a dry air velocity of 17 m/min. (at 200° C). The results of these tests are tabulated in the following Table II:

TABLE II

| Sample Carbon Base | $KOH-I_2$* Impregnation % by Wt | I/K | pH | I Penetration, % | Ignition Temp. ° C |
|---|---|---|---|---|---|
| 1. Coal | 2.8% $I_2$,1.2%K | 0.72 | 10.9 | 0.003 | 330 |
| 2. Coal | 4.4% $I_2$,1.9%K | 0.72 | 11.0 | 0.002 | 310 |
| 3. Coconut (K-free) | 2.2% $I_2$,1.1%K | 0.62 | 10.4 | 0.002 | 355 |
| 4. Petroleum | 3.0% $I_2$,1.5%K | 0.60 | 10.7 | 0.002 | 315 |
| 5. Coal | 4%$I_2$(Vapor), 1.2%K | 0.99 | 10.7 | 0.018 | — |
| 6. Coconut** | 1.5%$I_2$(Vapor) | 0.29 | 9.7 | 0.015 | 340 |
| 7. Coconut** | 2.7%$I_2$(Vapor) | 0.54 | 9.3 | 0.057 | 340 |
| 8. Coconut** | 5.5%$I_2$(Vapor) | 1.18 | 8.0 | 0.755 | 390 |

*Samples 1–5
**Samples 6–8 have natural K content.

Samples 1–4 in Table II indicate that a pure activated carbon material that is liquid impregnated as described in Example I, will provide significantly improved iodine retention and that the ignition temperature is not unacceptably low. Further tests, shown in samples 5–8, indicate that as the I/K ratio increases above about one and the pH below about 8.0, the iodine penetration reaches an unacceptable level.

In addition to using $KOH-I_2$ impregnation of Example I, the activated carbon can be saturated with a liquid solution of KOH-KI or $KOH-KI-I_2$ to achieve an I/K ratio below about one and maintain the pH at 8.0 or above in the final impregnated product. Example II illustrates the use of KOH-KI treatment:

EXAMPLE II

Three samples of potassium-free activated carbon material were saturated with a liquid solution of KOH-KI in the concentrations shown in Table III. The procedure and testing were the same as described hereinabove in Example I. The results of the tests are set forth in Table III:

TABLE III

| Sample No. Carbon Base | KOH-KI Impregnation % by Wt | I/K | pH | I Penetration % | Ignition Temp. °C |
|---|---|---|---|---|---|
| 9. Coal | 3% I*, 1.5% K** | 0.62 | 10.2 | 0.002 | 340 |
| 10. Coal | 3% I*, 1.5% K** | 0.62 | 10.1 | 0.002 | 325 |
| 11. Petroleum | 3% I*, 1.5% K** | 0.62 | 10.1 | 0.001 | 335 |

*as KI
**as KI and KOH

The results confirm that other iodine and basic potassium compounds that provide the appropriate I/K ratio and pH will also provide uniform activated carbon material having improved iodine retention properties with acceptable ignition temperatures. For example, other basic potassium compounds that can be used with the iodine include KOH and $K_2CO_3$.

Activated carbon material can be co-impregnated with triethylenediamine (TEDA) and a mixture of iodine and basic potassium compounds such as a mixture selected from the group $KOH-I_2$, KOH-KI, or $KOH-KI-I_2$, to facilitate the recovery of organic iodides, such as methyl iodide, as well as elemental iodine. Also activated carbon previously impregnated with TEDA can be further impregnated as hereinabove described. It has been found that TEDA in amounts in excess of about 2% can not be used in some nuclear reactor confinement systems, because of the significant reduction in ignition temperature that results from TEDA impregnation. However, activated carbon impregnated with about 1% TEDA can be co-impregnated with the compounds described while maintaining an I/K ratio of less than one and a pH in excess of 8.0 to provide a product that will retain both the organic iodides as well as the elemental iodine from a nuclear system. In the treatment of activated carbon that includes TEDA, suitable drying temperature control must be exercised to avoid volatilization of the TEDA.

Activated carbon, that is treated as hereinabove described, can also be treated with a suitable flame retardant to raise the ignition temperature. Such treatment may be required where ignition temperatures in excess of 340° C are needed to meet standards for certain nuclear facilities. It has been found that sodium dihydrogen phosphate and potassium dihydrogen phosphate are particularly suitable for this purpose. For example, samples of impregnated petroleum base activated carbon material that had an initial ignition temperature of 330° C were separately treated with the flame retardants $NaH_2PO_4 \cdot H_2O$ or $KH_2PO_4$. Each treatment raised the ignition temperature of the activated carbon to over 400° C.

What is claimed is:

1. A carbon material having improved iodine retention properties consisting essentially of activated carbon materials impregnated with iodine, KI or mixtures thereof with basic potassium compounds wherein the ratio of I to K in said impregnated carbon material is less than about 1.0 and the pH of an aqueous extract of said carbon material is greater than about 8.0.

2. The carbon material of claim 1 wherein the ratio of I to K in said impregnated carbon material is between about 0.2 and 0.9 and the pH of an aqueous extract of said carbon is between about 8.5 and 10.5.

3. The carbon material of claim 1 wherein the basic potassium compounds are selected from the group consisting of KOH and $K_2CO_3$.

4. The carbon material of claim 1 wherein said activated carbon material is impregnated with a mixture of compounds selected from the group $KOH-I_2$, KOH-KI, and $KOH-KI-I_2$.

5. The carbon material of claim 4 wherein the ratio of I to K in said impregnated carbon is between about 0.2 and 0.9 and the pH of an aqueous extract of said carbon is between about 8.5 and 10.5.

6. The carbon material of claim 1 wherein said activated carbon material also contains the compound triethylenediamine in amounts between about 0.5% and 5% by weight.

7. The carbon material of claim 1 wherein said activated carbon also contains a flame retardant selected from the group consisting of sodium dihydrogen phosphate and potassium dihydrogen phosphate.

8. The method of improving the iodine retention of activated carbon material which comprises treating said carbon with iodine, KI or mixtures thereof with basic potassium compounds, said iodine, said KI, and said compounds being selected so as to maintain a ratio of I to K of less than about 1.0 and maintain the pH of an aqueous extract of said treated carbon at greater than about 8.0.

9. The method of claim 8 wherein said ratio of I to K is between about 0.2 and 0.9 and the pH of said aqueous extract is between about 8.5 and 10.5.

10. The method of claim 8 wherein the basic potassium compounds are selected from the group consisting of KOH and $K_2CO_3$.

11. The method of claim 8 wherein said activated carbon material is treated with a mixture of compounds selected from the group $KOH-I_2$, KOH-KI, and $KOH-KI-I_2$.

12. The method of claim 8 wherein said activated carbon is treated with triethylenediamine and with compounds selected from the group $KOH-I_2$, KOH-KI, and $KOH-KI-I_2$.

13. The method of claim 12 wherein said activated carbon is treated with triethylenediamine in amounts between 0.5% and 5% by weight.

14. The method of claim 8 wherein said activated carbon is also treated with a flame retardant selected from the group consisting of sodium dihydrogen phosphate and potassium dihydrogen phosphate.

15. A method of improving the iodine retention of activated carbon material which comprises (a) sizing activated carbon granules; (b) saturating said sized carbon granules with an aqueous solution of compounds selected from the group $KOH-I_2$, KOH-KI, and $KOH-KI-I_2$; (c) adjusting said solution so that the ratio of I to K in said carbon material is less than about 1.0 and the pH of an aqueous extract thereof is greater than about 8.0; and (d) drying said saturated carbon granules to form an impregnated activated carbon material having improved iodine retention.

* * * * *